(12) United States Patent
Batchelder et al.

(10) Patent No.: US 8,074,320 B2
(45) Date of Patent: Dec. 13, 2011

(54) AUTONOMOUS BLOWER FOR DEBRIS HERDING

(76) Inventors: Rachael Anne Batchelder, Somers, NY (US); John Samuel Batchelder, Somers, NY (US)

( * ) Notice: Subject to any disclaimer, the term of this patent is extended or adjusted under 35 U.S.C. 154(b) by 458 days.

(21) Appl. No.: 12/152,582

(22) Filed: May 15, 2008

(65) Prior Publication Data

US 2009/0282642 A1    Nov. 19, 2009

(51) Int. Cl.
*A47L 5/00*    (2006.01)
(52) U.S. Cl. .......................................... 15/319; 15/405
(58) Field of Classification Search ............... 15/319, 15/405
See application file for complete search history.

(56) References Cited

U.S. PATENT DOCUMENTS

| 5,735,018 | A  | * | 4/1998  | Gallagher et al. | ............. | 15/405 |
| 6,809,490 | B2 | * | 10/2004 | Jones et al. | ............. | 318/568.12 |
| 2004/0133316 | A1 | * | 7/2004 | Dean | ............................... | 701/23 |
| 2006/0020369 | A1 |   | 1/2006 | Taylor et al. | ................... | 700/245 |
| 2007/0157420 | A1 | * | 7/2007 | Lee et al. | ........................ | 15/328 |
| 2007/0294991 | A1 | * | 12/2007 | Medina et al. | ................. | 56/11.9 |
| 2010/0125968 | A1 | * | 5/2010 | Ho | ................................. | 15/319 |

OTHER PUBLICATIONS

U.S. Appl. No. 11/491,887, filed Jul. 2006, Batchelder.

* cited by examiner

*Primary Examiner* — Bryan R Muller
(74) *Attorney, Agent, or Firm* — Brian R. Morrison; Westman, Champlin & Kelly, P.A.

(57) ABSTRACT

An autonomous blower is described that utilizes GPS signals for blowing ground debris from a clearable area to a target area. A controller coordinates motors that propel and steer the autonomous blower. A database created in a teaching mode defines clearable, target, and no-trespassing areas with respect to GPS coordinates. An algorithm in the controller computes a serpentine trajectory for the autonomous blower so that it traverses the clearable area while transporting ground debris to the target area.

18 Claims, 6 Drawing Sheets

AUTONOMOUS BLOWER FOR DEBRIS HERDING

CROSS-REFERENCE TO RELATED APPLICATIONS

Reference is hereby made to co-pending U.S. patent application Ser. No. 12/152,607, filed on May 15, 2008, entitled "Blower and rotary rake for debris herding", and which published as U.S. Patent Application Publication No. 2009/0282795.

BACKGROUND OF THE INVENTION

Fallen leaves should be removed from a lawn soon after they fall, both for aesthetics and for the health of the lawn. Delaying their removal allows dew and rain on the fallen leaves to hasten their partial decomposition, which exacerbates their removal. Organizing people to periodically rake or blow a lawn can be expensive.

An automated technique for clearing leaves and other debris from lawns has similarities to robotic lawn mowers, such as described in U.S. Patent Application Publication 2004/0133316. There are also analogies to robotic vacuums for cleaning interior floors, exemplified by U.S. Pat. No. 7,024,278 pertaining to the Roomba vacuuming product.

Fallen leaves can be moved mechanically, as with a rake. They can be moved by pneumatic suction, as with a vacuum. They can be moved by pneumatic pressure, as with a blower. Blowers have proven to combine the best time efficiency for clearing leaves with low damage to the lawn and low susceptibility to clogging and fouling. However the technique of blowing is significantly more problematic for an automated technique than vacuuming, for at least three reasons. Blown leaves must generally be directed towards a target deposit area during the entire clearing process, instead of being picked into a hopper and later dumped. The order of what parts of an area should be cleared first matters, since leaves should generally not be blown onto cleared areas. The direction of motion of the blown leaves is generally different than the direction that the blowing apparatus is physically moving.

BRIEF SUMMARY OF THE INVENTION

The present invention is directed to an autonomous blower for moving debris on a surface. The blower includes a chassis mounted on wheels. A blower housing with a motor and a discharge chute is mounted to the chassis. Two drive motors actuate the wheels to steer and motivate the chassis to move about on the surface. A global positioning system (GPS) sensor is attached to the chassis. A controller attached to the chassis has access to a database describing the clearable area and the target area. The control determines a serpentine trajectory for the chassis, accepts position signals from the GPS sensor, and coordinates signals to the drive motors causing the chassis to traverse the serpentine trajectory, while the air exhausting through the discharge chute impels the leaves towards the target area. Motor driven louvers can be used to guide the discharge air into different orientations with respect to the chassis. A teaching mode generates the database of clearable area and target area.

BRIEF DESCRIPTION OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1A:
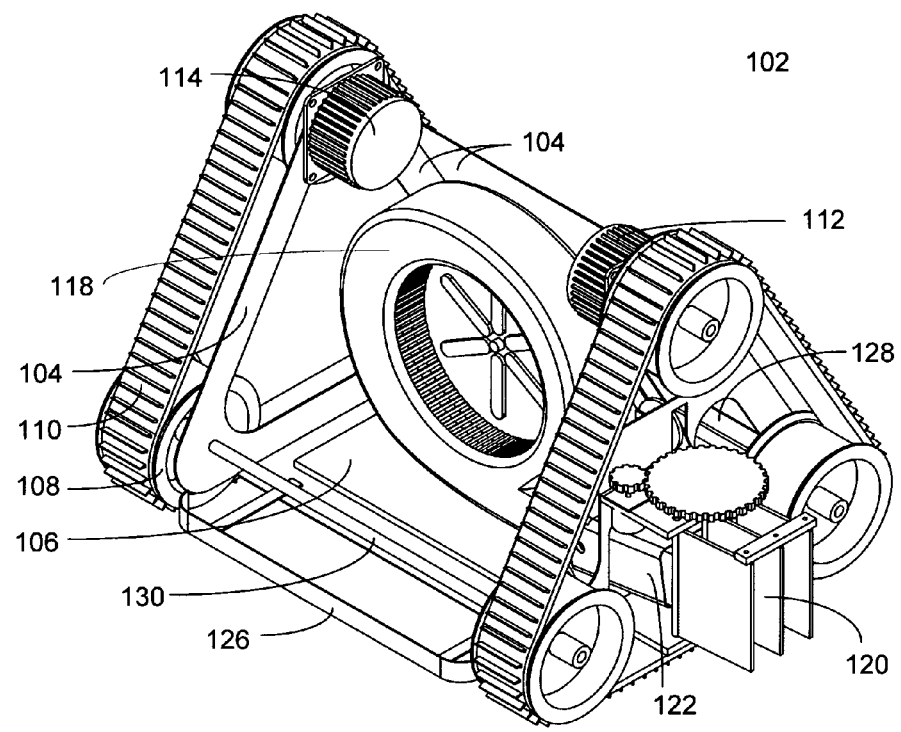
FIG. 1A is an isometric view of an autonomous blower for moving debris in accordance with the present invention.

As shown in FIG. 1A, an autonomous blower (102) comprises a chassis (104) or frame of stamped and welded metal. A counterweight (106) may be incorporated to lower the center of mass, as well as to resist the thrust of the exhausting air. Six wheels (108) on axles (13) are incorporated in this preferred embodiment for moving the chassis about on two independent tracks or belts (110). A first stepper motor (112) drives the front belt, and a second stepper motor (114) drives the rear belt. The symmetric design of this preferred embodiment allows the chassis to move laterally, to spin in place, and to right itself if it flips over. An alternative preferred embodiment has one motor steering a steerable wheel and another motor driving a drive wheel. An alternative preferred embodiment has a first motor driving a first drive wheel, a second motor driving a second drive wheel, and an idler wheel.

A controller (116) is attached to the chassis (104). The controller comprises preferably a 16-bit processor with ROM, RAM, EEROM, and motor control interfaces, such as a Microchip dsPIC30F6014. Rechargeable batteries (128) are attached to the chassis, and provide power to the controller (116). Pulse width modulated (PWM) signals from the controller (116) drive the motors (112 and 114). Encoder signals are returned from the motors (112 and 114) to the controller (116) for diagnostics. The controller contains a global positioning system (GPS) sensor that provides signals given the position and orientation of the chassis with respect to the surface being cleared. In the most preferred embodiment the GPS sensor is a Category II receiver with WAAS differential correction, such as a Garmin GPS V6, providing accuracy within 9 meters and an update rate of 1 Hertz. Bumpers (126)

along both sides of the chassis (104) signal the controller (116) when the autonomous blower is about to collide with an object in its path.

A video camera (132) provides feedback to the controller (116) relevant to the quantity of leaves being blown. While general scene analysis is likely to be challenging for an inexpensive controller, a simple frame-to-frame shift-and-subtract will highlight moving leaves in the field of view of the video camera (132) even while the assembly is moving. If the coverage of leaves is thick, feedback based on waiting for lack of frame-to-frame image motion will cause the autonomous blower to slow down.

A blower housing (118) is attached to the chassis (104). A blower motor (124) drives the centripetal blower wheel inside the blower housing (118), creating a blast of exhaust air out of the exhaust duct (122). Louvers (120) deflect the exhaust air.

Nickel-metal-hydride rechargeable batteries (128) are used in the most preferred embodiment. Other power sources are used in less preferred embodiments, including nickel-cadmium batteries, lithium batteries, lead acid batteries, super capacitors, solar cells, fuel cells, and a gasoline powered generator.

Figure 1B:
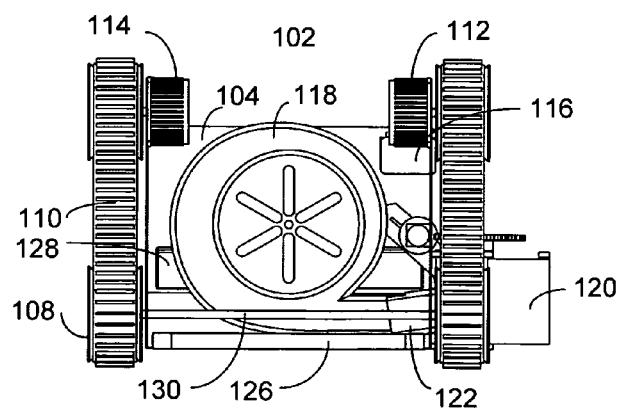
FIG. 1B is a side view of the autonomous blower shown in FIG. 1A.
Figure 1C:
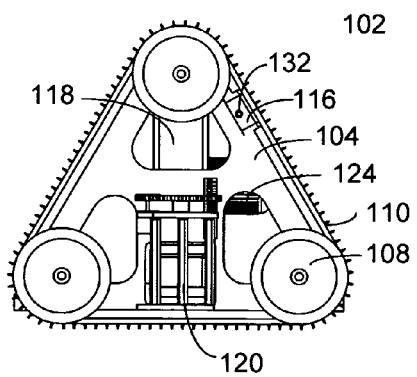
FIG. 1C is a front view of the autonomous blower shown in FIG. 1A.

FIG. 1B and FIG. 1C give side and front views of the preferred embodiment, respectively.

Figure 2A:
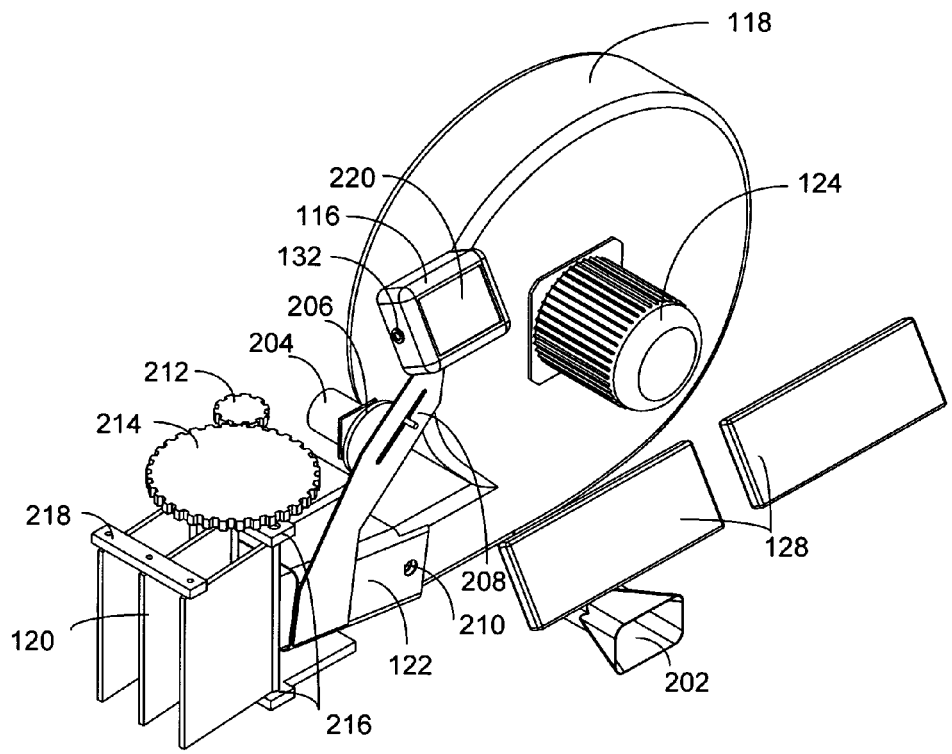
FIG. 2A is an isometric sub-assembly view of the autonomous blower shown in FIG. 1A, wherein the chassis, wheels, axles, and bumpers have been suppressed to make the remaining structures more apparent.

FIG. 2A shows an isometric sub-assembly view of the preferred embodiment of FIG. 1A. The chassis (104), axles (130), motors (112 and 114), wheels (108), tracks (110), counterweight (106), and bumpers (126) are suppressed in FIGS. 2A, 2B, and 2C. In FIG. 2A the nickel-metal-hydride batteries (128) and the controller (116) are more readily seen. A display screen (220) on the controller provides visual feedback to an operator, particular in teaching mode. A docking port (202) is attached to the chassis and is electrically connected to the controller (116). A separate stationary docking station (not shown) with a connection to the power grid supports the mating connector to the docking port (202), so the preferred embodiment can recharge itself by maneuvering adjacent to the docking station and mating a powered connector with the docking port (202).

Figures 2B, 2C:
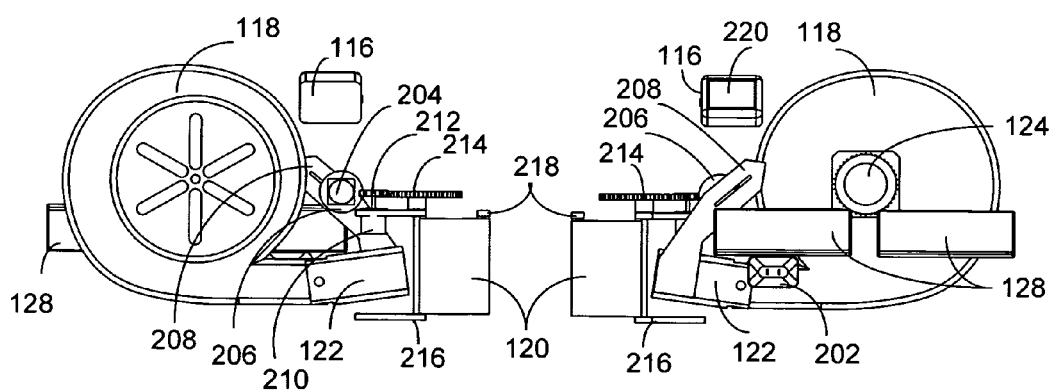
FIG. 2B is a side view of the sub-assembly of the autonomous blower shown in FIG. 2A.
FIG. 2C is the opposing side view of the sub-assembly of the autonomous blower shown in FIG. 2A.

The isometric view of FIG. 2A, along with the side views FIG. 2B and FIG. 2C, show the operation of the adjustable direction chute (122) and louvers (120). The controller (116) sends signals to operate the chute motor (204) which turns a cam (206) in a cam follower (208) attached to the chute (122). The chute (122) attaches to the blower housing (118) at a pivot (210). The chute motor (204) allows the controller (116) to direct exhaust air away from or towards the plane of the surface to be cleaned of debris. A louver motor (210) attached to the chassis (not shown in this view) rotates the engaged gears (212 and 214) to pivot the louvers (120) about their hinge points in their mounting plate (216) and linkage (218). The louver motor (210) allows the controller (116) to direct exhaust air in a direction other than perpendicular to the usual propagation direction for the autonomous blower chassis.

Figure 3:
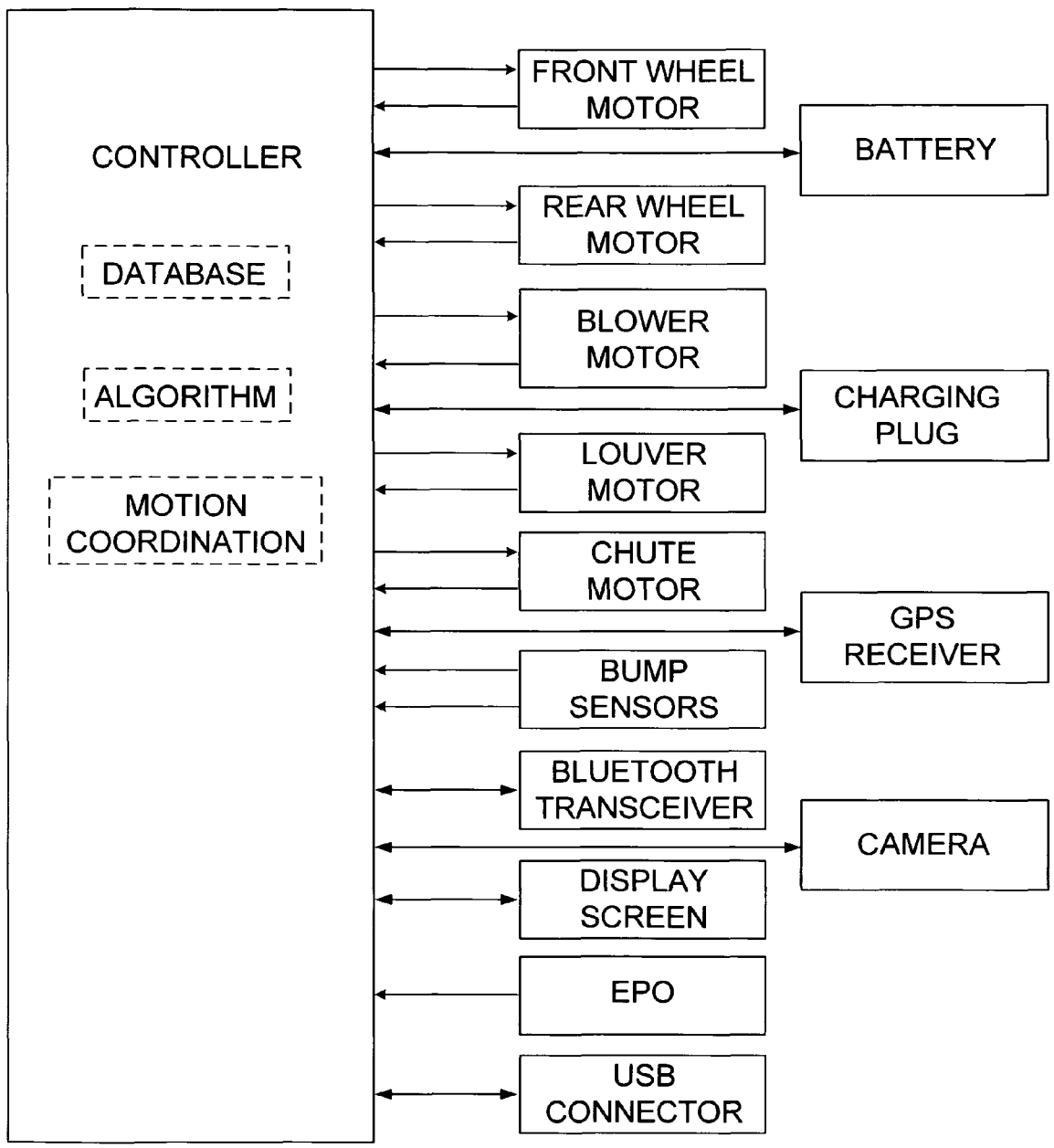
FIG. 3 is a block diagram of signal connections of an autonomous blower for moving debris in accordance with the present invention.

FIG. 3 shows signal and power connections between the controller of the preferred embodiment of the autonomous blower and other components of the apparatus. In addition to coordinating the motion of the two locomotion motors (112 and 114), shown as the front wheel motor and the rear wheel motor, the controller also controls the speed of the blower motor; the blower motor speed can be shut down during transit times between cleanable areas to save power, and it can be increased if the camera signal from the camera (132) indicates that the leaf coverage is heavy. Connections between the controller and the battery, the louver motor, the GPS receiver, the bump sensors, the display screen, and the camera have be previously described. The preferred embodiment has an emergency power off (EPO) button attached to the chassis that allows an operator to promptly shut down motion and power to the apparatus.

Two additional electrical connections are provided in the preferred embodiment to external signals: a USB connector is available for a wired connection, and a Bluetooth transceiver is available for a wireless connection. Alternative preferred embodiments have other types of connections, including Ethernet, wireless USB, LAN, wireless LAN, cellular telephone, IRDA infrared link, RS232, and Firewire. One of these connections is used in training mode, described subsequently.

The controller (116) of the preferred embodiment contains a database specifying the clearable areas and the target areas. In an alternative preferred embodiment, the controller accesses a remotely stored database using a wireless connection. The controller (116) of the preferred embodiment contains an algorithm for computing a serpentine trajectory for the chassis useful for blowing debris from the clearable areas. In an alternative preferred embodiment, the controller accesses a remote processor using a wireless connection, and the remote processor computes a serpentine trajectory for the chassis for blowing debris from the clearable areas. The controller of the preferred embodiment (116) contains code that coordinates the predetermined serpentine trajectory with feedback signals from the GPS, the bumper sensors (126), and the camera (132), to generate drive signals to the motors (112 and 114).

Figure 4:
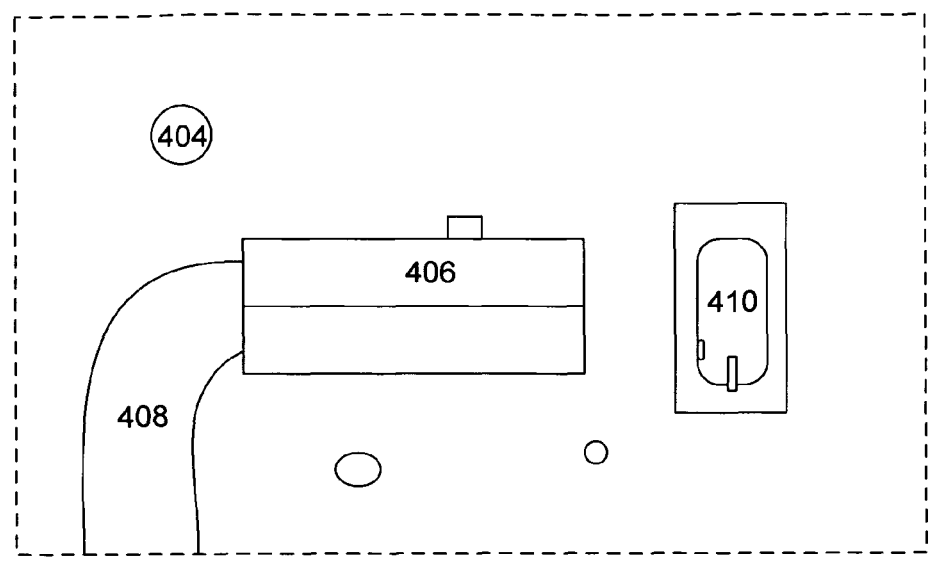
FIG. 4 is a map of an area where an autonomous blower for moving debris will be utilized.

The remaining figures provide an example of teaching the controller the clearable and target areas, and of computing serpentine trajectories for the chassis. FIG. 4 shows an exemplary map of the boundaries of a piece of real estate (402), showing a tree (404), a house (406), a driveway (408), and a pool (410).

Figure 5:
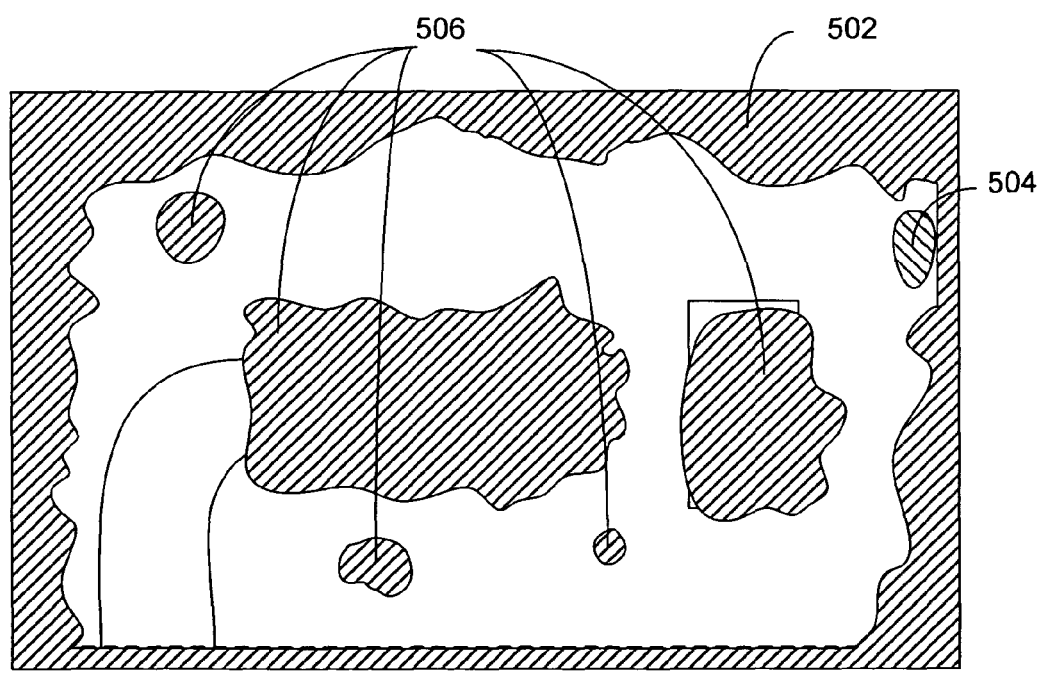
FIG. 5 is the map of FIG. 4 wherein clearable and target areas have been defined in a database.

FIG. 5 shows the perimeters contained in the database of the controller of the preferred embodiment after the teaching mode has been performed. To generate this data, a manual joystick on a cable (not shown) is connected to the USB connector of the controller (116). An operator walks beside the apparatus while in the teaching mode, directing it to traverse the loop forming the boundary between the clearable area and the outer no-trespassing area in a clockwise direction. The controller records GPS positions while traversing the loop, and computes the outer rectangular bounding box of somewhat larger dimensions than all of the coordinates received, and computes the outer no-trespassing area (502). Additional no-trespassing areas are similarly programmed by manually causing the apparatus to traverse loops around those areas (506). A target area (504) is similarly defined by manually directing the preferred embodiment to traverse the bounding perimeter using the joystick.

An alternative preferred embodiment allows a user to combine manual operation of the blower assembly with a teaching mode. The user places the controller in a manual teaching mode, then walks the autonomous blower through the entire process of manually blowing debris from the clearable area(s) to the target area(s), and then indicates the end of the manual teaching mode. The controller creates a database from some of the traversed GPS waypoints during the manual teaching mode. The controller extracts the clearable, target, and no-trespassing areas from the GPS waypoint information. The controller extracts a preferred time sequence of clearing portions of the clearable area.

An alternative preferred embodiment uses a video screen and a mouse to define the bounding perimeters of the clearable areas and no-trespassing areas. The operation can be performed on the screen (220) of the controller (116), or on a remote workstation. The map upon which the perimeters are defined can be based on satellite imagery.

Figure 6:
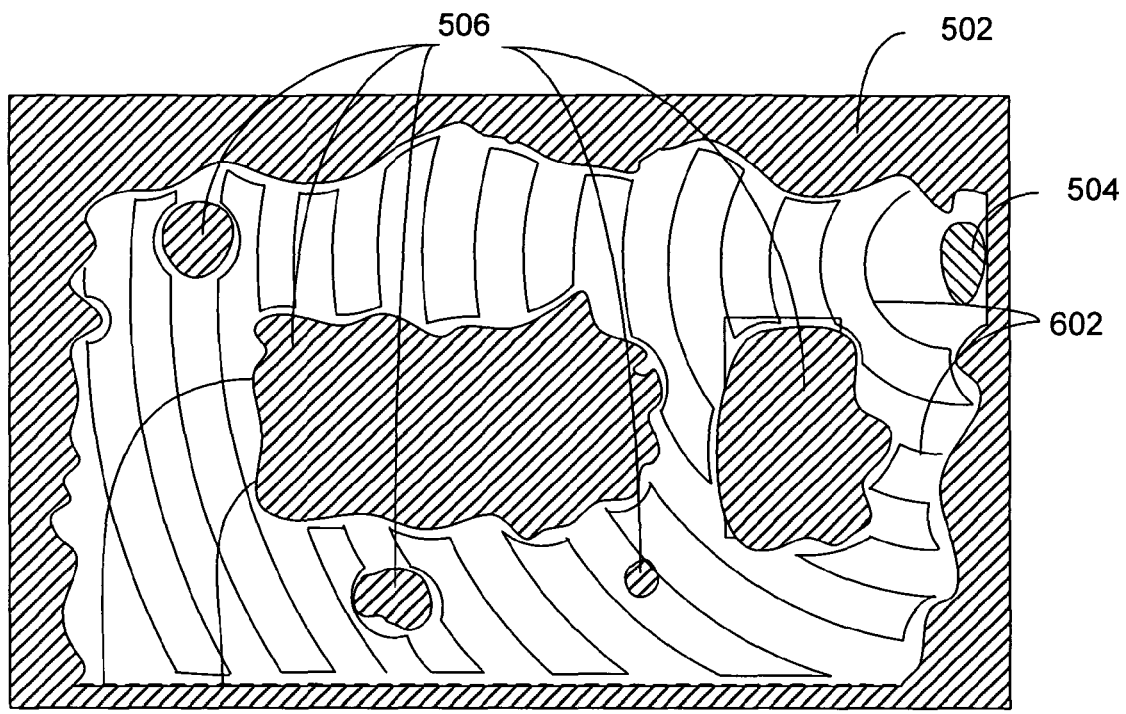
FIG. 6 is the map of FIG. 5 wherein is shown an exemplary serpentine trajectory.

FIG. 6 shows a less preferred algorithm for traversing the clearable area with a serpentine trajectory (602). A series of concentric circles are drawn about the centroid of the target area, where the difference in radii of two adjacent circles is a fraction of the distance in front of the louvers that the exhaust air will typically clear of leaves. The fraction should be between 0.1 and 0.9. The intersections between the concentric circles and the loops defining the clearable area are computed, and the circular arcs outside of the clearable area are discarded, leaving a list of circular arcs in the clearable area. Closely spaced free ends of adjacent circular arcs are joined to create at least one serpentine trajectory (602). This algorithm is less preferred because it will tend to blow leaves into the no-trespassing zones, such as the left side of the house.

Figure 7:
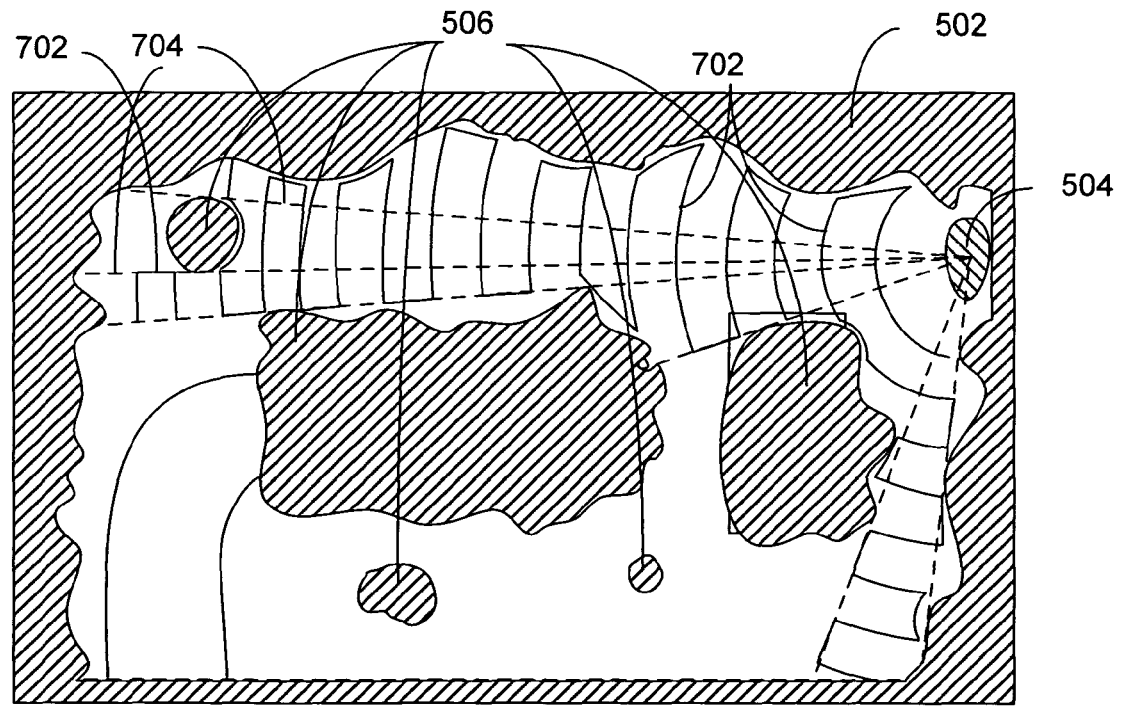
FIG. 7 is the map of FIG. 5 wherein is shown an exemplary serpentine trajectory and obscuration lines.

FIG. 7 shows the first iteration of the preferred algorithm for traversing the clearable area with a serpentine trajectory (702). A ray is swept about an origin at the centroid of the target area, and everywhere that ray is tangent to a clearable area bounding loop the angular orientation of the ray is recorded as a tangent ray (704). A series of concentric circles are drawn about the centroid of the target area, as in the less preferred algorithm previously described. The intersections between the concentric circles and the loops defining the clearable area are computed, and the circular arcs outside of the clearable area are discarded, leaving a list of circular arcs in the clearable area. Circular arcs that cross a tangent ray farther from the target area than the tangent point of the ray with the bounding loop are broken at their intersection, and the portion of the circular arc obscured from the target area by the bounding loop is discarded. Closely spaced free ends of adjacent circular arcs are joined to create at least one serpentine trajectory (702). This trajectory generally will not traverse the entire clearable area.

Figure 8:
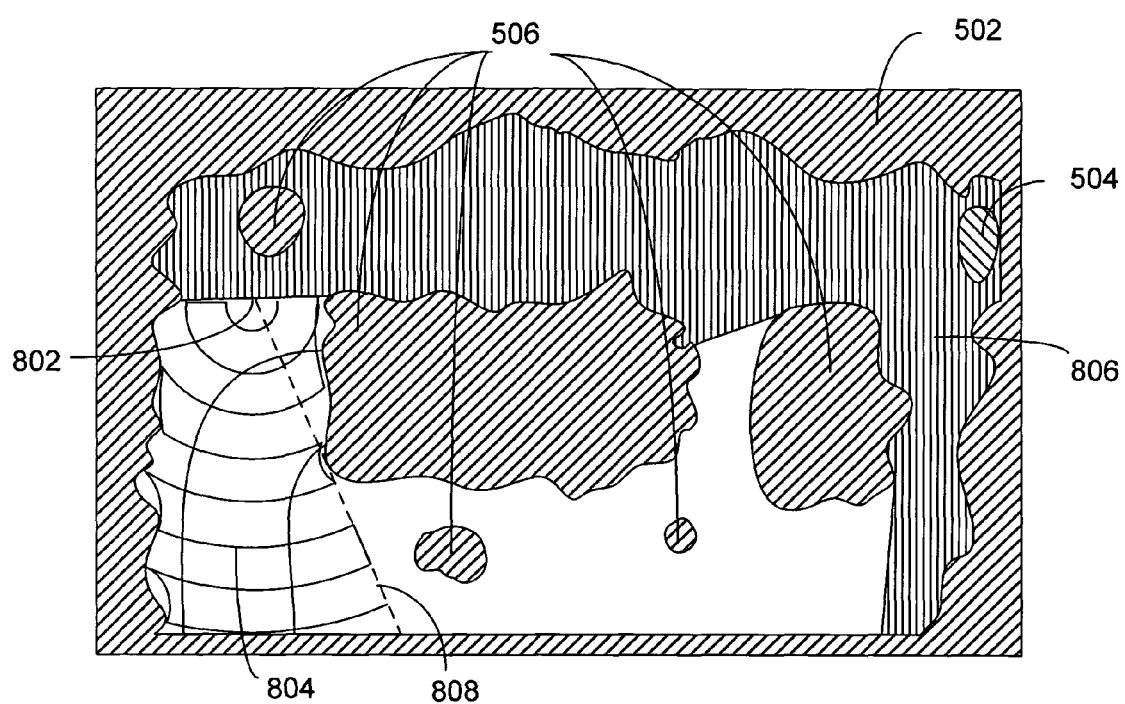
FIG. 8 is the map of FIG. 7 wherein is shown additional exemplary serpentine trajectories and obscuration lines.

FIG. 8 shows the second iteration of the preferred algorithm for traversing the clearable area with a serpentine trajectory (804). The area cleared by the trajectory calculated in the first iteration is identified (806) and subtracted from the clearable area remaining. A new target centroid (802) is selected at a boundary between the clearable area and the area cleared by the serpentine trajectory of the first iteration (806). The algorithm of the first generation is then applied again to this centroid; a ray is swept about the new centroid (802) target area, and everywhere that ray is tanget to a clearable area bounding loop the angular orientation of the ray is recorded as a tangent ray (808). Circular arcs are calculated about the new centroid (802) and concatentated to form at least one serpentine trajectory (804). The algorithm is repeated until the area to be cleared remaining is sufficiently small.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An autonomous blower comprising:
a chassis;
a plurality of wheels rotatably connected to the chassis;
at least one motor configured to rotate the plurality of wheels;
a global positioning system (GPS) receiver retained by the chassis and configured to provide GPS signals indicative of the global coordinates of the chassis;
an air-exhausting blower retained by the chassis and configured to blow ground debris that is located adjacent to the chassis;
a computer storage medium configured to retain GPS coordinates that identify a clearable area and a target area; and
a controller retained by the chassis and configured to generate approximately concentric circles of GPS coordinates from a point within the target area, to identify circular arcs of the generated approximately concentric circles that are within the clearable area, to generate at least one serpentine trajectory of GPS coordinates based at least in part on the identified circular arcs, and to store the at least one serpentine trajectory to the computer storage medium;
wherein the controller is further configured to receive the GPS signals provided by the GPS receiver, and to provide drive signals to the at least one motor to direct the chassis along the at least one serpentine trajectory of GPS coordinates based on the received GPS signals, thereby directing debris that is blown by the air-exhausting blower to be blown from the clearable area to the target area.

2. The autonomous blower of claim 1, wherein the computer storage medium is further configured to retain GPS coordinates that identify at least one no-trespassing area.

3. The autonomous blower of claim 1, wherein the computer storage medium is further configured to retain GPS coordinates that identify at least one no-blowing area.

4. The autonomous blower of claim 3, and further comprising an air deflector retained by the chassis and configured to receive a signal from the controller, wherein the controller is further configured to direct blown air away from the at least one no-blowing area.

5. The autonomous blower of claim 1, and further comprising an obstacle avoidance sensor attached to the chassis and configured to provide a signal to the controller.

6. The autonomous blower of claim 1, wherein the controller is further configured to sweep a ray of GPS coordinates radially around the point within the target area, to identify locations where the swept ray of GPS coordinates intersects boundaries of the clearable area, and to modify the identified circular arcs based on the identified locations where the swept ray of GPS coordinates intersects the boundaries of the clearable area.

7. The autonomous blower of claim 1, wherein the computer storage medium is further configured to retain second GPS coordinates that identify a second clearable area and a second target area, and wherein the controller is further configured to generate second approximately concentric circles of GPS coordinates from a second point within the second target area, to identifying second circular arcs of the generated second approximately concentric circles that are within the second clearable area, to generate at least one second serpentine trajectory of GPS coordinates based at least in part on the identified second circular arcs, and to store the at least one second serpentine trajectory to the computer storage medium.

8. The autonomous blower of claim 7, wherein the controller is further configured to provide second drive signals to the at least one motor to direct the chassis along the at least one second serpentine trajectory of GPS coordinates based on the received GPS signals, thereby directing debris that is blown by the air-exhausting blower to be blown from the second clearable area to the second target area.

9. The autonomous blower of claim 8, wherein the controller is further configured to sweep a ray of GPS coordinates radially around the point within the second target area, to identify locations where the swept ray of GPS coordinates intersects boundaries of the second clearable area, and to modify the identified second circular arcs based on the identified locations where the swept ray of GPS coordinates intersects the boundaries of the second clearable area.

10. The autonomous blower of claim 1, wherein the controller is further configured to accumulate the GPS coordinates of the clearable area and the target area in a teaching mode, and to store the GPS coordinates in the of the clearable area and the target area to the computer storage medium.

11. A system for blowing ground debris, the system comprising:
- a computer storage medium configured to retain GPS coordinates that identify a clearable area and a target area; and
- an autonomous blower that is separate from the computer storage medium, and configured to communicate with the computer storage medium, the autonomous blower comprising:
  - a chassis;
  - a plurality of wheels rotatably connected to the chassis;
  - at least one motor configured to rotate the plurality of wheels;
  - a global positioning system (GPS) receiver retained by the chassis and configured to provide GPS signals indicative of the global coordinates of the chassis;
  - an air-exhausting blower retained by the chassis and configured to blow ground debris that is located adjacent to the chassis; and
  - a controller retained by the chassis and configured to generate approximately concentric circles of GPS coordinates from a point within the target area, to identify circular arcs of the generated approximately concentric circles that are within the clearable area, to generate at least one serpentine trajectory of GPS coordinates based at least in part on the identified circular arcs, and to store the at least one serpentine trajectory to the computer storage medium;
  - wherein the controller is further configured to receive the GPS signals provided by the GPS receiver, and to provide drive signals to the at least one motor to direct the chassis along the at least one serpentine trajectory of GPS coordinates based on the received GPS signals, thereby directing debris that is blown by the air-exhausting blower to be blown from the clearable area to the target area.

12. The system of claim 11, wherein the controller is further configured to sweep a ray of GPS coordinates radially around the point within the target area, to identify locations where the swept ray of GPS coordinates intersects boundaries of the clearable area, and to modify the identified circular arcs based on the identified locations where the swept ray of GPS coordinates intersects the boundaries of the clearable area.

13. The system of claim 11, wherein the computer storage medium is further configured to retain second GPS coordinates that identify a second clearable area and a second target area, and wherein the controller is further configured to generate second approximately concentric circles of GPS coordinates from a second point within the second target area, to identifying second circular arcs of the generated second approximately concentric circles that are within the second clearable area, to generate at least one second serpentine trajectory of GPS coordinates based at least in part on the identified second circular arcs, and to transmit the at least one second serpentine trajectory to the computer storage medium.

14. The system of claim 13, wherein the controller is further configured to provide second drive signals to the at least one motor to direct the chassis along the at least one second serpentine trajectory of GPS coordinates based on the received GPS signals, thereby directing debris that is blown by the air-exhausting blower to be blown from the second clearable area to the second target area.

15. The system of claim 14, wherein the controller is further configured to sweep a ray of GPS coordinates radially around the point within the second target area, to identify locations where the swept ray of GPS coordinates intersects boundaries of the second clearable area, and to modify the identified second circular arcs based on the identified locations where the swept ray of GPS coordinates intersects the boundaries of the second clearable area.

16. The system of claim 11, wherein the controller is further configured to accumulate the GPS coordinates in the of the clearable area and the target area in a teaching mode, and to transmit the GPS coordinates of the clearable area and the target area to the computer storage medium.

17. The system of claim 11, and further comprising an air deflector retained by the chassis and configured to receive a signal from the controller.

18. The system of claim 11, and further comprising an obstacle avoidance sensor attached to the chassis and configured to provide a signal to the controller.

* * * * *